United States Patent [19]

Simon

[11] 4,044,199

[45] Aug. 23, 1977

[54] APPARATUS FOR APPLYING TORQUE TO ELECTRODES

[75] Inventor: Irvin C. Simon, Kenmore, N.Y.

[73] Assignee: Union Carbide Corporation, New York, N.Y.

[21] Appl. No.: 585,685

[22] Filed: June 10, 1975

[51] Int. Cl.² .................... F16H 21/12; F16H 1/06; H05B 7/18; H05B 7/14
[52] U.S. Cl. .................................. 13/18; 13/14; 74/413; 74/63
[58] Field of Search ............... 74/424.7, 424.8 R, 63, 74/413; 13/14, 18; 219/138

[56] References Cited

U.S. PATENT DOCUMENTS

| | | | |
|---|---|---|---|
| 705,724 | 7/1902 | Lipson | 279/2 |
| 761,348 | 5/1904 | Baines | 279/2 |
| 1,827,852 | 10/1931 | Marshall | 13/14 |
| 1,900,934 | 3/1933 | Hudson | 279/2 |
| 1,918,522 | 7/1933 | Crane | 279/2 |
| 2,937,984 | 5/1960 | Chapellier | 74/424.8 R X |
| 3,524,004 | 8/1970 | Van Nostran et al. | 13/14 |
| 3,898,364 | 8/1975 | Hardin | 13/14 |

Primary Examiner—Leonard H. Gerin
Attorney, Agent, or Firm—Frederick G. McCarthy, Jr.

[57] ABSTRACT

Apparatus for applying torque to a vertically suspended electrode whereby threaded electrode sections can be readily connected.

2 Claims, 8 Drawing Figures

FIG. I

APPARATUS FOR APPLYING TORQUE TO ELECTRODES

The present invention relates to an apparatus for applying torque to electrodes. More particularly the present invention is directed to an apparatus for threading together large diameter electrode sections of the type used in electric furnaces.

In electric furnace operations, e.g. metallurgical smelting operations, the carbon or graphite electrodes employed are usually large diameter, i.e. several feet, and are arranged vertically above the furnace and lowered into the furnace as the electrode is gradually consumed. When consumption of the electrode has proceeded to the extent that a new electrode is required, a commom procedure is to join a new electrode section to the remaining portion of the partially consumed electrode by means of a threaded nipple engagement. Previous methods for accomplishing the joining of such large electrode sections required careful handling of the electrode by several persons.

Figure 1:
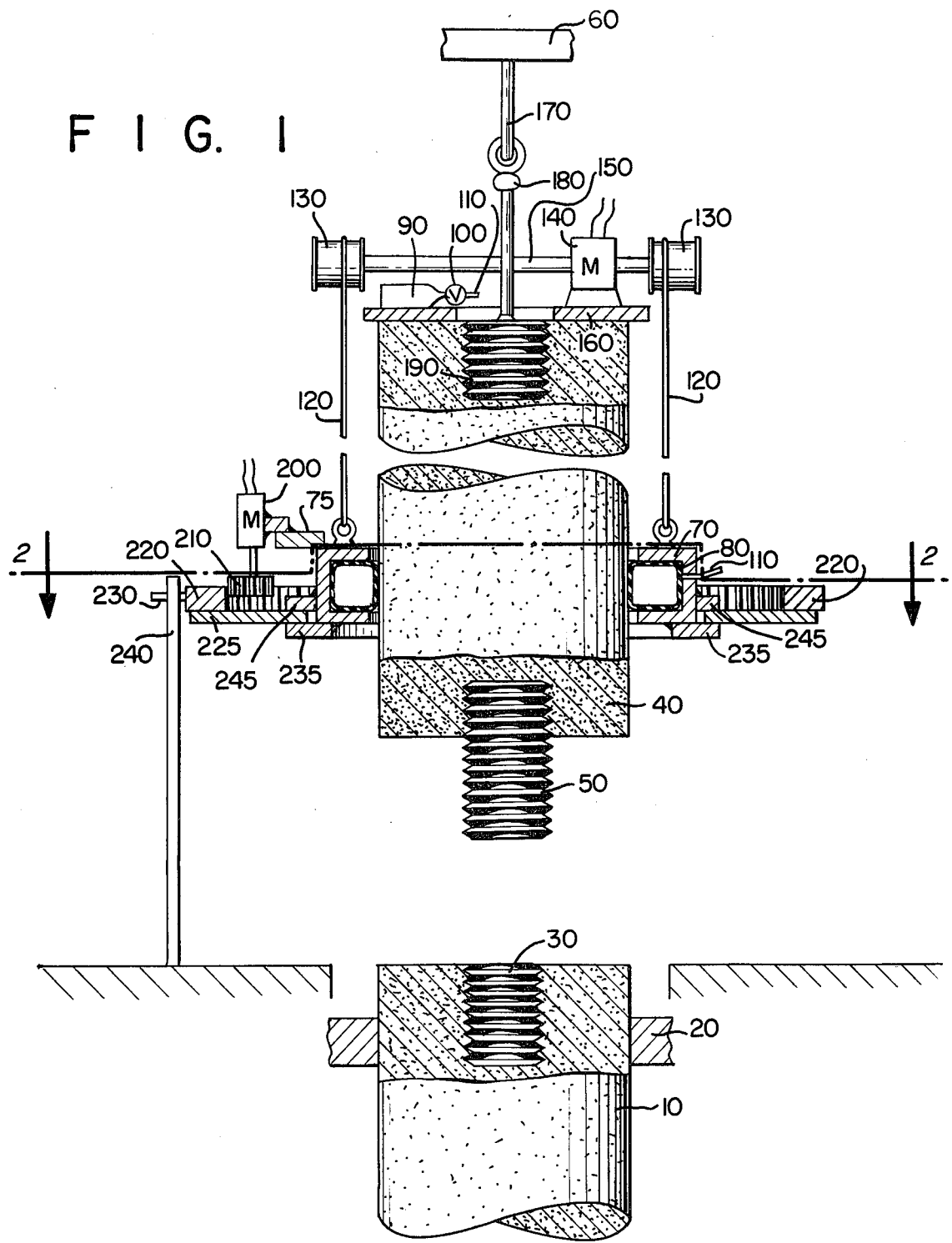
Figure 2:
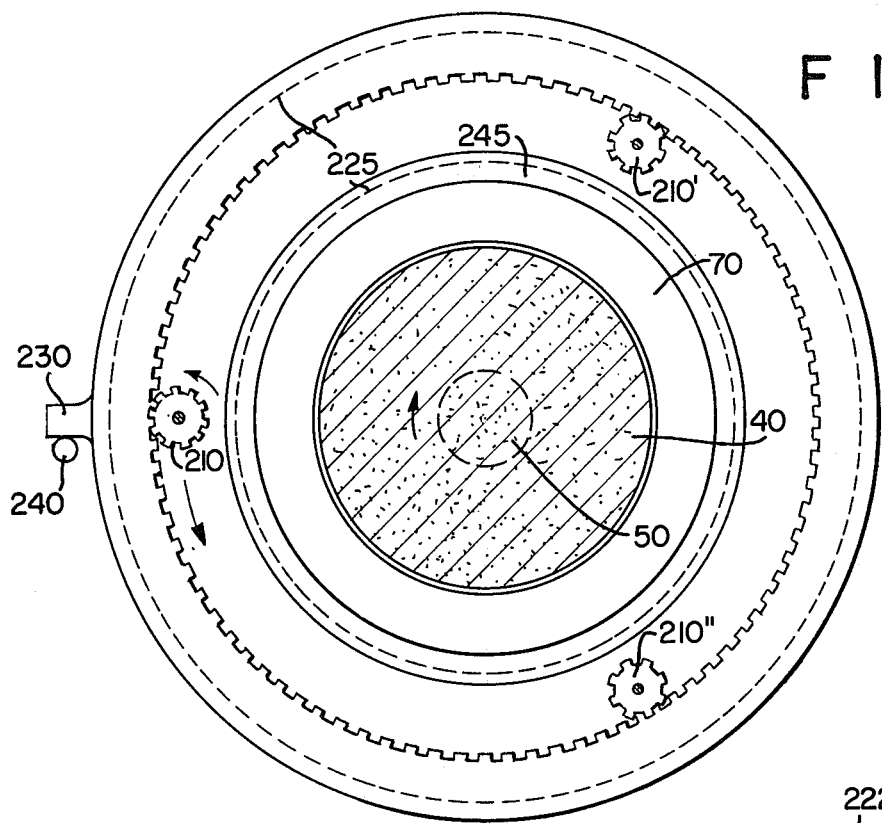

It is an object of the present invention to provide an apparatus for automatically and rapidly joining electrode sections. Other objects will be apparent from the following description and claims taken in conjunction with the drawings in which FIG. 1 is an elevation view, partly in section, of an apparatus in accordance with the present invention and FIG. 2 is a plan view along line 2—2 of FIG. 1.

Figure 3D:
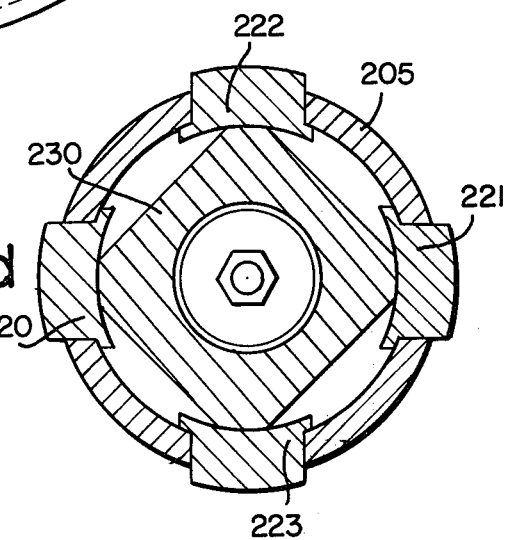
Figure 3C:
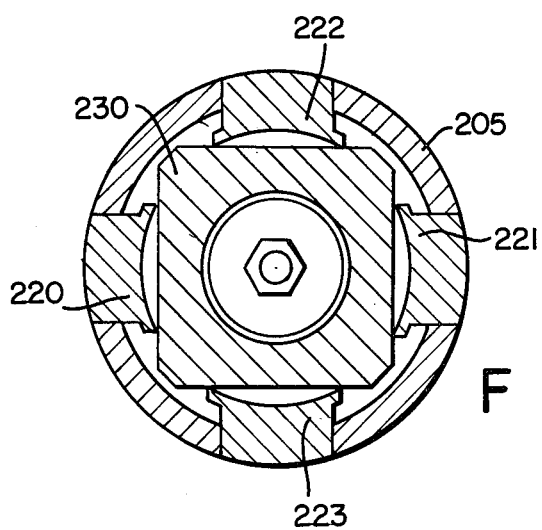
Figure 3B:
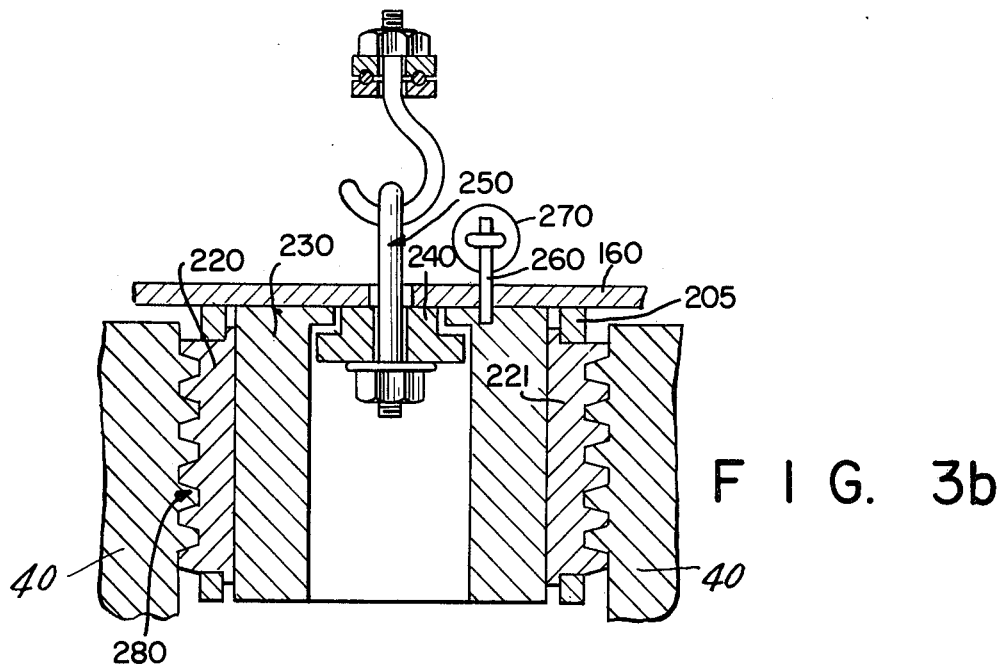
Figure 3A:
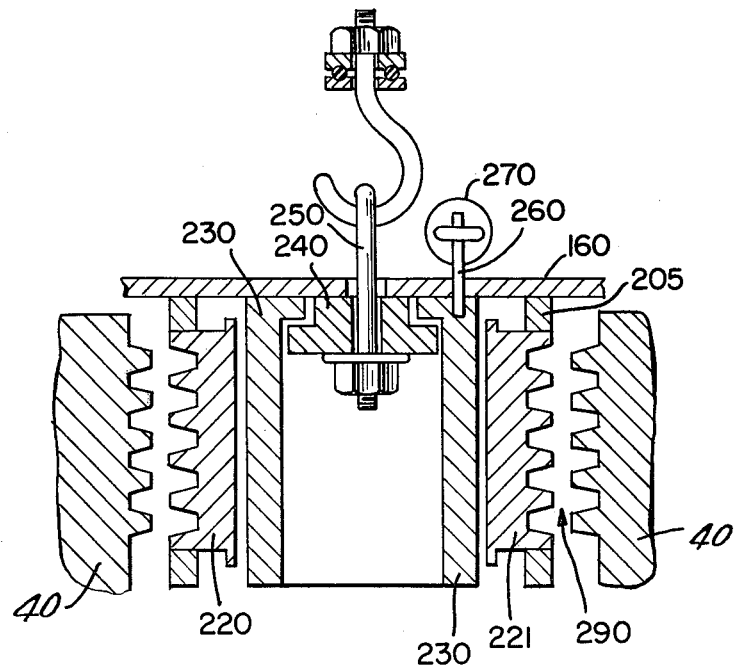
Figure 3E:
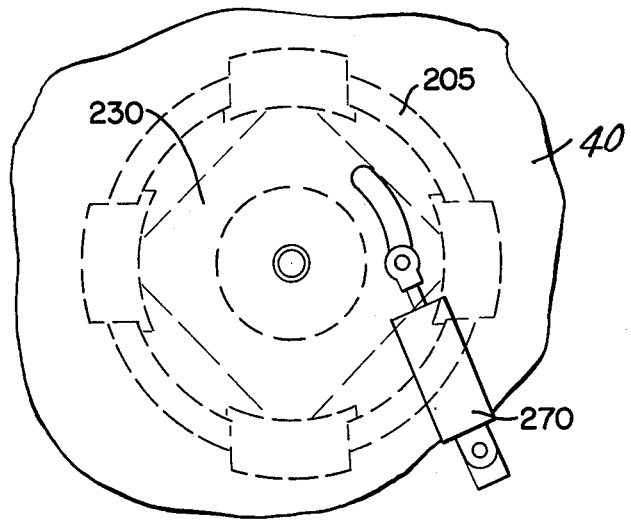
Figure 3F:
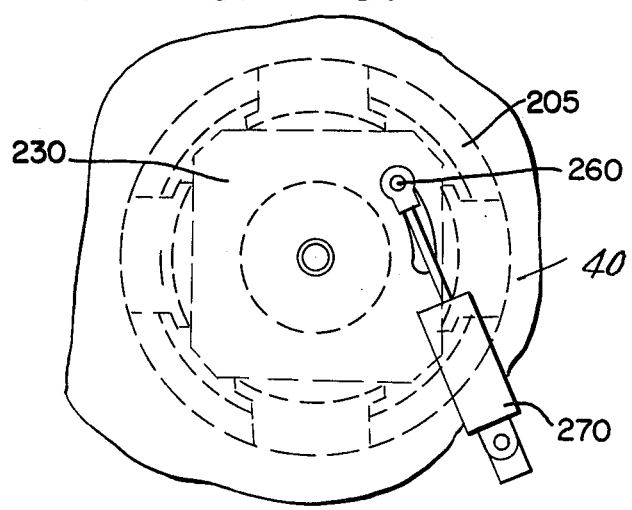

FIG. 3a is a sectional elevation view of an electrode engaging device in accordance with the present invention showing the device in the disengaged position FIG. 3b is a view similar to FIG. 3a showing the device in the engaged position FIGS. 3c, 3d, 3e and 3f are plan views of the device of FIGS. 3a and 3b illustrating the engagement of the device.

An apparatus in accordance with the present invention for applying torque to a vertically suspended electrode section comprises a ring member surrounding the electrode section and fixedly engaged thereto; a ring gear member rotatably supported by said ring member and surrounding said electrode section; drive means fixedly supported on said ring member; a drive gear coupled to said drive means and engaging said ring gear; arrestings means fixedly positioned with respect to the vertical axis of said electrode and arranged to engage said ring gear and prevent rotation of said ring gear upon engagement therewith whereby upon actuation of said drive means torque is applied to cause rotation of said electrode section.

The present invention will be more fully understood with reference to the drawing wherein the numeral 10 refers to a partially consumed electrode section which is fixedly held by a conventional clamp member 20 and extends vertically downward into an electric furnace (not shown). Electrode section 10 has a threaded passage 30 for joining with a new electrode section 40. Electrode section 40 has a threaded nipple extension 50 and is positioned directly over electrode section 10, e.g. by a crane member represented at 60. The function of the apparatus of the present invention is to automatically rotate electrode section 40 when it is lowered to a position with threaded nipple 50 engaging threaded passage 30 whereby the electrode section 40 is threadably joined to electrode section 10. The apparatus of the present invention comprises a metal ring member 70 which encloses an inflatable tube 80, for example made of rubber. Upon inflation of tube 80 from tank 90 by way of valve 100 and conduit 110, ring member 70 is fixedly engaged to electrode section 40. Ring member 70 is attached by cables 120 to drums 130 which can be driven by motor 140 by way of shaft 150 to raise or lower ring 70 to a desired position prior to inflation of tube 80. Motor 140 is supported on a metal plate 160 which rests on electrode section 40. Electrode section 40 is supportably held by crane hook 170 which engages swivel 180. Swivel 180 is attached to a plug 190 which threadably engages electrode section 40. In operation drive motor 200, fixedly mounted on ring 70 as shown at 75 drives pinion gear 210 which is engaged to ring gear 220. Ring gear 220 is slidably supported on an annular plate 225 which is supportably held by extensions 235 and 245 of ring member 70. Ring gear 220 will rotate only until catch member 230, attached to ring gear 220, contacts the stationary arresting member 240 which is securely mounted on the floor of the building in which the electric furnace is located; thereafter the torque developed by drive motor 200 will cause electrode section 40 to rotate and upon lowering electrode section 40 into engagement with passage 30 of electrode section 10, the electrode sections will be threadably joined. In a preferred form of the invention three motor driven gears symmetrically arranged on ring 70 are employed as shown in FIG. 2.

In a particular embodiment of the present invention, a device having adjustable threaded segments is used to engage and support electrode section 40 instead of the screw-in type plug indicated at 190. With reference to FIG. 3a, the supporting device is shown having a cylindrically shaped housing member 205 having peripheral apertures 210 in which segments 220, 221, 222 and 223 having Acme type threads are slidably arranged. A rotatable cam block 230 is arranged within housing 200 and secured to plate 160 by way of bearing block 240 and support rod arrangement 250. Rod 260 is engaged to cam block 230 at a distance from the central axis of cam block 230. When actuated by the air cylinder 270 mounted on plate 160', rod 260 causes cam block 230 to move from the disengaged position shown in FIG. 3a to the engaged position shown in FIG. 3b causing segments 220, 221, 222 and 223 to engage electrode section 40 as shown at 280 in FIG. 3b. The disengaged segment position shown at 290 in FIG. 3a represents the position of the segments when cam block 230 is in the position shown in FIG. 3c. In operation, the device described above is lowered into the threaded passage of the electrode section 40, with segments 220, 221, 222 and 223 disengaged as shown in FIGS. 3c and 3a. Air cylinder 270 is then actuated to rotate cam block 230 to the position indicated in FIGS. 3b and 3d to cause the segments to engage the electrode section 40. The above-described device thus avoids the time consuming and laborious operation of rotating, i.e. screwing in a plug of the type shown at 190 in FIG. 1.

What is claimed is:

1. Apparatus for applying torque to a vertically suspended electrode section comprising a ring member surrounding the electrode section and fixedly engaged thereto; a ring gear member rotatably supported by said ring member and surrounding said electrode section; drive means fixedly supported on said ring member; a drive gear coupled to said drive means and engaging said ring gear; arresting means fixedly positioned with respect to the vertical axis of said electrode section and arranged to engage said ring gear and prevent rotation thereof upon engagement therewith whereby upon actuation of said drive means torque is applied to cause rotation of said electrode section.

2. Apparatus in accordance with claim 1 wherein said ring member includes an inflatable tube which surrounds said electrode section which upon inflation fixedly attaches said ring member to said electrode section.

* * * * *